United States Patent
Kim

(10) Patent No.: US 8,422,354 B2
(45) Date of Patent: Apr. 16, 2013

(54) CHANNEL ESTIMATION METHOD AND APPARATUS USING DATA CHANNEL

(75) Inventor: Hyun Cheol Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 649 days.

(21) Appl. No.: 12/639,669

(22) Filed: Dec. 16, 2009

(65) Prior Publication Data

US 2010/0149990 A1    Jun. 17, 2010

(30) Foreign Application Priority Data

Dec. 16, 2008 (KR) .................. 10-2008-0127687

(51) Int. Cl.
*H04L 5/00* (2006.01)

(52) U.S. Cl.
USPC ........................ 370/203; 375/147

(58) Field of Classification Search .......... 370/203–208; 375/147–150
See application file for complete search history.

(56) References Cited

U.S. PATENT DOCUMENTS

| 8,165,186 | B2* | 4/2012 | Luo et al. ...................... 375/148 |
| 2002/0164967 | A1* | 11/2002 | Miyoshi et al. ............ 455/226.1 |
| 2002/0181624 | A1* | 12/2002 | Gonzalez et al. ............. 375/346 |
| 2006/0164270 | A1* | 7/2006 | Miller et al. .................. 341/143 |
| 2007/0036243 | A1* | 2/2007 | D'Amico et al. ............. 375/340 |
| 2007/0121554 | A1* | 5/2007 | Luo et al. ...................... 370/335 |

* cited by examiner

*Primary Examiner* — Kibrom T Hailu
*Assistant Examiner* — Benjamin Lamont
(74) *Attorney, Agent, or Firm* — The Farrell Law Firm, P.C.

(57) ABSTRACT

A channel estimation method and apparatus that use a data channel are provided for improving channel estimation accuracy in a wireless communication system. The channel estimation apparatus includes a channel value extraction unit that extracts a first estimation value from a potential pilot signal received through a pilot channel and extracts a second estimation value from a potential data signal received through the data channel. The apparatus also includes a weight calculator that calculates a weight for determining a utilization ratio of the potential data signal in channel estimation from an error rate of the potential data signal. The apparatus further includes a channel estimator that estimates a final estimation value using the first estimation value and the second estimation value weighted by the weight calculated by the weight calculator.

10 Claims, 7 Drawing Sheets

CHANNEL ESTIMATION METHOD AND APPARATUS USING DATA CHANNEL

PRIORITY

This application claims priority under 35 U.S.C. §119(a) to an application entitled "CHANNEL ESTIMATION METHOD AND APPARATUS USING DATA CHANNEL" filed in the Korean Intellectual Property Office on Dec. 16, 2008 and assigned Serial No. 10-2008-0127687, the content of which is incorporated to herein by reference.

BACKGROUND OF THE INVENTION

1. Field of the Invention

The present invention relates generally to wireless communication and, more particularly, to a channel estimation method and apparatus using a data channel in a wireless communication system that is capable of improving channel estimation accuracy by adjusting a data channel utilization ratio based on a bit error rate of the data channel.

2. Description of the Related Art

In high-speed wireless communication systems, Inter-Symbol Interference (ISI) caused by channel distortion or multipath propagation is a main cause in the obstruction of reliable communications. Therefore, recent wireless communication systems are preferably based on Code Division Multiple Access (CDMA) and Orthogonal Frequency Division Multiplexing (OFDM) due to their ability to prevent ISI.

In the CDMA or OFDM-based wireless communication system, channel estimation is performed in order to compensate for signal distortion on the channel. There are two categories of channel estimation algorithms, namely, Pilot Symbol Aided Channel Estimation using training symbols (i.e., pilot symbols) known to the receiver and Decision Directed Channel Estimation using data symbols and pilot symbols.

The Decision Directed Channel Estimation algorithm utilizes both the pilot symbols and the data symbols under the assumption that the decided data symbols are accurate and can be used as training symbols. In principle, in the absence of transmission error, the high availability of pilot information can be used. Thus, a superior estimation result is expected as compared to the Pilot Symbol Aided Channel Estimation algorithm.

However, since the hard decision value of the data channel is used in the conventional Decision Directed Channel Estimation algorithm, the symbols of the erroneous data channel can act as interference with a low active Signal to Noise Ratio (SNR). Particularly, when the Bit Error Rate (BER) is high, the channel estimation performance can be degraded significantly, and worse than that of the Pilot Symbol Aided Channel Estimation algorithm.

SUMMARY OF THE INVENTION

The present invention has been made to address at least the above problems and/or disadvantages and to provide at least the advantages described below. Accordingly, an aspect of the present invention provides a channel estimation method and apparatus using a data channel that is capable of adjusting a utilization ratio of a data channel estimation value for the channel estimation by applying BER of the data channel in calculating a weight value of a signal input to the channel estimator, resulting in an improvement in channel estimation performance.

According to one aspect of the present invention, a channel estimation apparatus that uses a data channel is provided. The apparatus includes a channel value extraction unit that extracts a first estimation value from a potential pilot signal received through a pilot channel, and extracts a second estimation value from a potential data signal received through the data channel. The apparatus also includes a weight calculator that calculates a weight for determining a utilization ratio of the potential data signal in channel estimation from an error rate of the potential data signal. The apparatus further includes a channel estimator that estimates a final estimation value using the first estimation value and the second estimation value weighted by the weight calculated by the weight calculator.

According to another aspect of the present invention, a channel estimation method that uses a data channel is provided. A first estimation value is extracted from a potential pilot signal received through a pilot channel and a second estimation value is extracted from a potential data signal received through the data channel. A weight is calculated that determines a utilization ratio of the potential data signal in channel estimation from an error rate of the potential data signal. A final estimation value is estimated using the first estimation value and the second estimation value.

According to a further aspect of the present invention, a channel estimation to apparatus that uses a data channel is provided. The apparatus includes a weight calculator that calculates a weight for determining a utilization ratio of a potential data signal in channel estimation from an error rate of the potential data signal. The apparatus also includes a hard decision unit that makes a hard decision on the potential data signal for removing a data component of the potential data signal using a previous channel estimation value. The apparatus further includes a first estimation value extractor that extracts a first estimation value of a channel from a potential pilot signal received through a pilot channel and amplifies a gain of the first estimation value. The apparatus additionally includes a second estimation value extractor that extracts a second estimation value of the channel from a potential data signal received through a data channel and amplifies a gain of the second estimation value using the weight calculated by the weight calculator. The apparatus also includes a channel estimator that estimates a final estimation value of the channel using the gain-adjusted first estimation value and the gain-adjusted second estimation value.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1A:
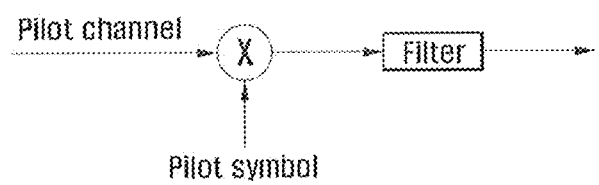
FIG. 1A is a diagram illustrating channel estimation using a signal received through a pilot channel in the Pilot Symbol Aided Channel Estimation algorithm.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

In the following description, the term "potential pilot signal" denotes a signal that receiver receives through a pilot channel, which includes a pilot signal with a channel value and noise. Also, the term "potential data signal" denotes a signal that the receiver receives through a data channel, which carries data traffic with a channel value and noise.

In the following description, the term "first estimation value" denotes an estimation value calculated by using the pilot signal, and the term "second estimation value" denotes an estimation value calculated by using the data signal.

Figure 1B:
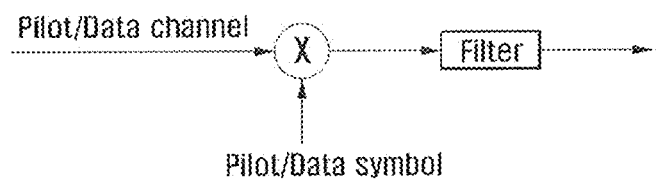
FIG. 1B is a diagram illustrating channel estimation using a signal received through a pilot channel in the Decision Directed Channel Estimation algorithm.

Referring initially to FIGS. 1A and 1B, a diagram illustrates channel estimation using a signal received through a pilot channel in the Pilot Symbol Aided Channel Estimation and the Decision Directed Channel Estimation algorithms.

Since the pilot signal is known to the receiver, the receiver can acquire the channel estimation value by multiplying the known pilot signal with the received pilot signal.

The pilot channel-based channel estimation method does not use the data channel and, as a consequence, it is difficult to expect reliable channel estimation performance when pilot channel energy is insufficient.

The conventional Decision Directed Channel Estimation method uses inaccurate data decided at the receiver and thus degrades channel estimation performance.

In an embodiment of the present invention, the utilization ratio of the data, which is decided by a Hard Decision unit of the receiver, is adjusted according the Bit Error Ratio (BER), thereby achieving increased performance as compared to the pilot channel-based channel estimation method.

Figure 2:
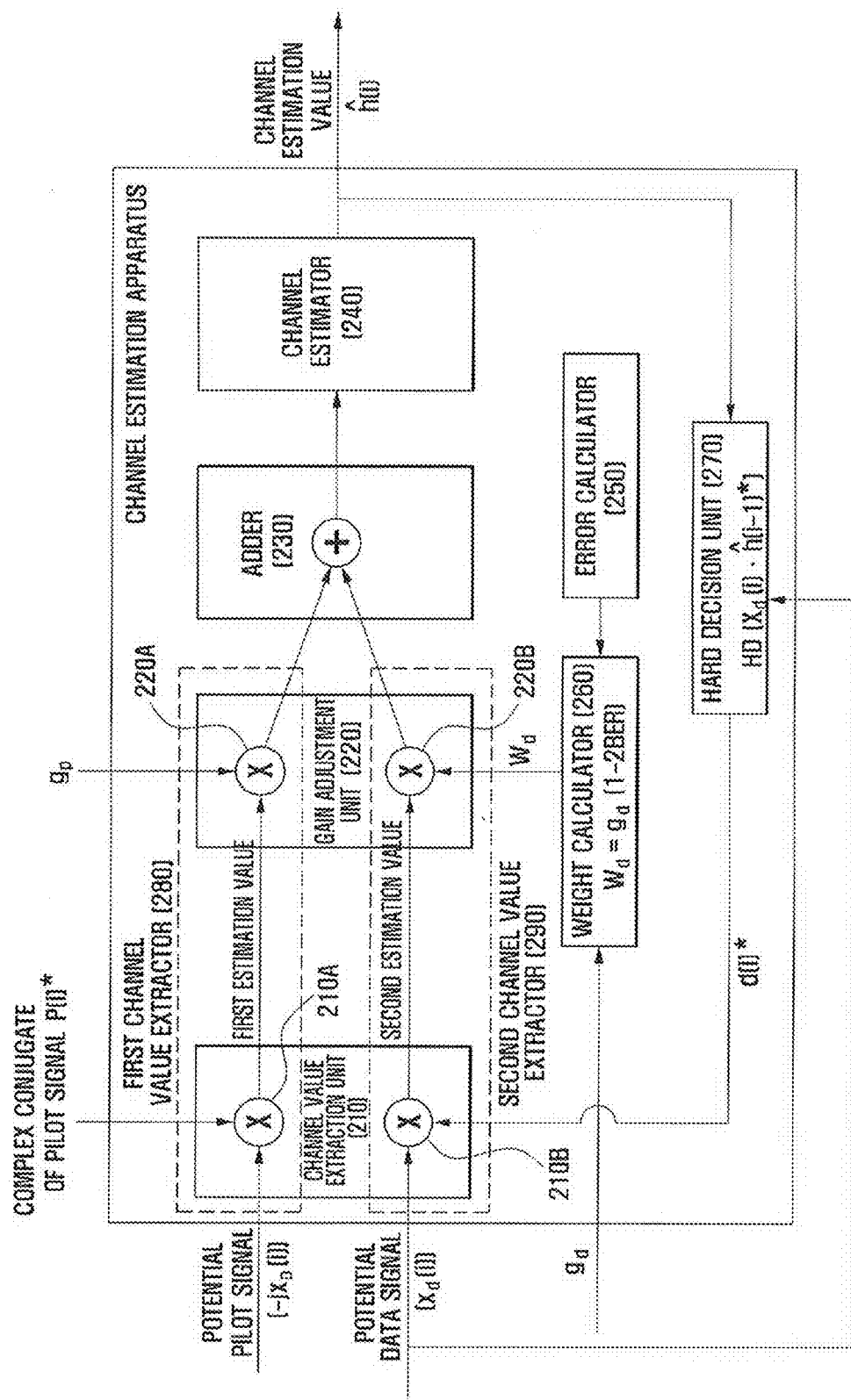
FIG. 2 is a block diagram illustrating a configuration of a channel estimation apparatus, according to an embodiment of the present invention.

FIG. 2 is a block diagram illustrating a configuration of a channel estimation apparatus, according to an embodiment of the present invention.

The channel estimation apparatus, according to an embodiment of the present invention, includes a channel value extraction unit 210, a gain adjustment unit 220, an adder 230, a channel estimator 240, an error calculator 250, a weight calculator 260, and a hard decision unit 270.

The channel value extraction unit 210 includes a first multiplier 210A for a potential pilot signal and a second multiplier 210B for a potential data signal. The gain adjustment unit 220 includes a third multiplier 220A for adjusting the gain of a first channel estimation value output by the first multiplier 210A, and a fourth multiplier 220B for adjusting the gain of a second channel estimation value output by the second multiplier 220B.

In an embodiment of the present invention, the first multiplier 210A for a to potential pilot signal and the third multiplier 220A for adjusting the gain of the first channel estimation value output by the first multiplier 210A constitute a first estimation value extractor 280. The second multiplier 210B for the potential data signal and the fourth multiplier 220B for adjusting the gain of the second channel estimation value output by the second multiplier 210B constitute a second estimation value extractor 290.

The channel value extraction unit 210 receives potential pilot signal ($-jx_p(i)$) and potential data signal ($-x_d(i)$) transmitted by a transmitter. A potential pilot signal is received through the pilot channel and includes a pilot signal to which $-j$ can be multiplied in consideration of phase.

A potential data signal is received through the data channel and includes a data signal (traffic and/or control signal). In an embodiment of the present invention, the data channel is an Enhanced-Dedicated Physical Control CHannel (E-DPCCH) used in a High Speed Uplink Packet Access (HSUPA) system.

The potential pilot signal can be expressed as Equation (1).

$$x_p(i) = j * g_p * h(i) * p(i) + n_p(i) \tag{1}$$

$p(i)$ denotes the pilot signal transmitted by the transmitter and is known to the receiver (assuming transmission power=1). $h(i)$ denotes the channel value. $g_p$ denotes a gain factor known to the receiver for adjusting the relative signal size when the transmitter transmits the pilot signal. $n_p(i)$ denotes the noise. $j$ denotes a factor reflecting the phases of the potential pilot signal and the potential data signal.

The potential data signal can be expressed as Equation (2).

$$x_d(i) = g_d * h(i) * d(i) + n_d(i) \tag{2}$$

$d(i)$ is denotes the data signal transmitted by the transmitter (assuming transmission power=1). $g_d$ denotes a gain factor known to the receiver for adjusting the relative signal size when the transmitter transmits the data signal. $n_d(i)$ denotes the noise.

The potential pilot signal and the potential data signal are received through the channels with different phases. Although the factor $j$ is multiplied by the potential pilot signal to differentiate the phases of the potential pilot signal and the potential data signal, channel phase can be changed depending upon system implementation.

The channel value extraction unit 210 receives a complex conjugate $p(i)^+$ of the pilot signal and a complex conjugate $\hat{d}(i)^+$ of the hard decision result data output by the hard decision unit 270 simultaneously with the potential pilot and data signals. The operation of the hard decision unit 270 is described in greater detail below.

The channel value extraction unit 210 multiplies the potential pilot signal and the complex conjugate of the pilot signal so as to output the first estimation value of the channel. The first estimation value of the channel means that the value was estimated from the potential pilot signal. The channel value extraction unit 210 multiplies the potential data signal and the complex conjugate of the hard decision result data so as to output the second estimation value. The second estimation value of the channel means that the value was estimated from the potential data signal.

The first estimation value can be obtained by multiplying the potential pilot signal and the complex conjugate as shown in Equation (3):

$$\begin{aligned}\text{first estimation}\\ \text{value of channel}(i)'\end{aligned} = -jx_p(i) * p(i)^* \tag{3}$$

$$= -j * [j * g_p * h(i) * p(i) + n_p(i)] * p(i)^*$$

$$= [g_p * h(i) * p(i) * p(i)^*] + [n_p(i) * p(i)^*]$$

$$= [g_p * h(i)] + [n_p(i) * p(i)^*]$$

The channel value extraction unit 210 multiplies the complex conjugate of the pilot signal with the potential pilot signal by means of the first multiplier 210A in order to output the first estimation value ĥ₁(i) of the channel.

In a similar manner, the second estimation value can be obtained by multiplying the potential data signal and the complex conjugate of the hard decision result data as shown in Equation (4):

$$\text{second estimation value of channel}(\hat{h}_2(i))' = x_d(i) * (i)^* \quad (4)$$
$$= [g_p * h(i) * d(i) + n_d(i)] * (i)^*$$
$$= [g_d * h(i) * d(i) * (i)^*] + [n_d(i) * (i)^*]$$
$$= [g_d * h(i) * e(i)] + [n_d(i) * (i)^*]$$

e(i) denotes a parameter multiplied when an error exists in the hard decision signal. For example, if an error exists in the hard decision signal, the value is set to −1 and, otherwise, the value is set to 1. The channel value extraction unit 210 multiplies the complex conjugate of the hard decision result value with the potential data signal by means of the second multiplier 210B in order to output the second estimation value ĥ₂(i) of the channel.

The gain adjustment unit 220 adjusts signal gains in order to maximize the SNRs of the first and second estimation values that are output by the channel value extraction unit 210. The gain adjustment unit 220 uses Maximum Ratio Combining (MRC) to adjust the gains of the estimation values of the respective channels.

The gain adjustment unit 220 multiplies the first estimation value with a relative value $g_p$ of its size by means of the third multiplier 220A.

The gain adjustment unit 220 also multiplies the second estimation value with a value $w_d$ obtained by weighting the relative value $g_d$ of its size by means of the fourth multiplier 220B. The weighted value $w_d$ is described in greater detail below.

Although the gains of the first and second estimation values of the channel are adjusted simultaneously in the embodiment of the present invention described above, it is obvious to those skilled in the art that only the gain of the second estimation value can be adjusted.

The adder 230 sums the gain-adjusted first estimation value and the gain-adjusted second estimation value input by the gain adjustment unit 220, and Outputs the sum value.

The channel estimator 240 reduces the noise level of the sum of the first and second estimation values that is output from the adder 230, and outputs a final channel value.

The error calculator 250 calculates an error rate during signal transmission. The error rate can be the BER, which indicates the ratio of the total number of bits received to those that were erroneous during a predetermined transmission time.

Figure 7:
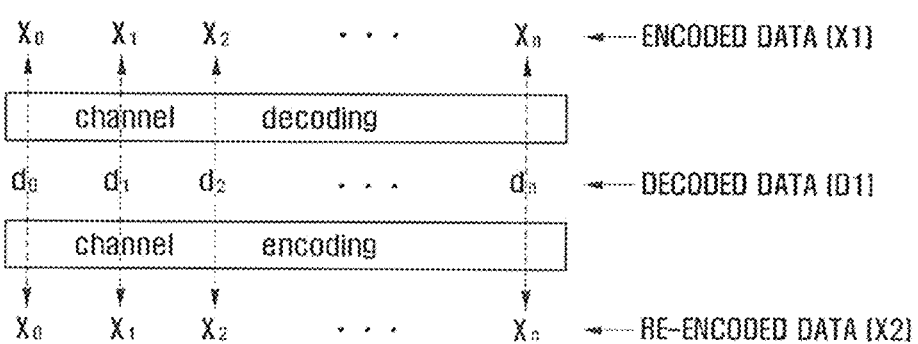
FIG. 7 is a diagram illustrating BER calculation in the channel estimation methodology of FIG. 3, according to an embodiment of the present invention.

A BER calculation process according to an embodiment of the present invention is described with reference to FIG. 7. The error calculator 250 encodes decoded data (D1) of the potential data signal in order to output re-encoded data (X2), and compares encoded data (X1) of the received potential data signal with the re-encoded data (X2) one by one to calculate the BER. The calculated BER is used for channel estimation of the next frame. In order to reduce the variance of the BER, multiple BER values of previous frames can be used.

In an embodiment of the present invention, the error calculator 250 can measure the SNR of the data channel, and calculate the BER using a probability at which the mark is inversed using the SNR and a Probability Density Function of the signal's Gaussian noise. In the Gaussian distribution having an average of 0 and a variance of 1, the BER of the signal having a specific average and variance can be calculated by converting a Q-Function representing a probability at which the signal is greater than x.

The error calculator 250 can also use the BERs of multiple previous frames to reduce the variance of the BER.

The weight calculator 260 calculates utilization (i.e. weight) of the second estimation value of the channel that is input to the channel estimator 240 using the BER calculated by the error calculator 250. Specifically, the weight calculator 260 determines a utilization ratio of the second estimation value calculated from the data channel according to the current data channel environment.

The channel estimator can be implemented with a Finite Impulse Response Filter (FIR) represented by Equation (5):

$$\hat{h}(i) = \sum_{n=-F}^{F} FIRW(n) * x(i+n) \quad (5)$$

FIRW(n) denotes a coefficient of the FIR and x(i) denotes the input data of the channel estimator. When n is similar, the FIRW(n) has a similar value.

If e(i) is −1 in Equation (4) (i.e., there exists an error), it offsets a signal component of a neighbor symbol having no error and thus the noise is added to the of two symbols. Specifically, assuming that the e(i) in the ĥ₂(i) of x(i) is −1 (error exists). Equation (5) can be written as Equation (6).

$$(i) = \ldots wd^*(FIRW(0)^*gd^*h(i)^*(-1)+FIRW(1)^*gd^*h(i+1)^*(1)+n(i+1)+\ldots \approx \ldots +wd^*(n(i)+n(i+1)+\ldots \quad (6)$$

In Equation (6), FIRW(0) and FIRW(1) have similar values, and h(i) and h(i+1) have similar values such that a signal having an error and its one neighbor signal can be regarded erroneous signals. Accordingly, when K errors exist, the optimum wd becomes 2K in consideration 0.1 other K signals offset by the errors as expressed by Equation (7).

$$'wd' = g_d * (N - 2K)/N \quad (7)$$
$$= g_d * (1 - 2BER)$$

'$g_d$' denotes a relative value of the size of the second estimation value. The weighted value of the data channel that is to be multiplied with the second estimation value of the channel by the gain adjustment unit 220 is equal to $w_d$. Specifically, the utilization ratio of the data channel for the channel estimation is determined by the BER.

The hard decision unit 270 receives the potential data signal $x_d(i)$ and the previously calculated channel estimation value ĥ(i−1)*. That is, the potential data signal transmitted by the transmitter is input to both the channel value extraction unit 210 and the hard decision unit 270 simultaneously.

The hard decision unit 270 multiplies the potential data signal input and the complex conjugate ĥ(i−1)⁺ of the previous channel estimation value to make a d(i) hard decision. The hard decision unit 270 outputs the decoded data d̂(i)⁺ to be used in Equation (4) for removing the data component from the currently received potential data signal.

By multiplying the decoded data d(i)⁺ output from the hard decision unit 270 with the potential data signal $x_d(i)$, the channel value extraction unit 210 outputs the second estimation value (Equation (4)).

Figure 3:
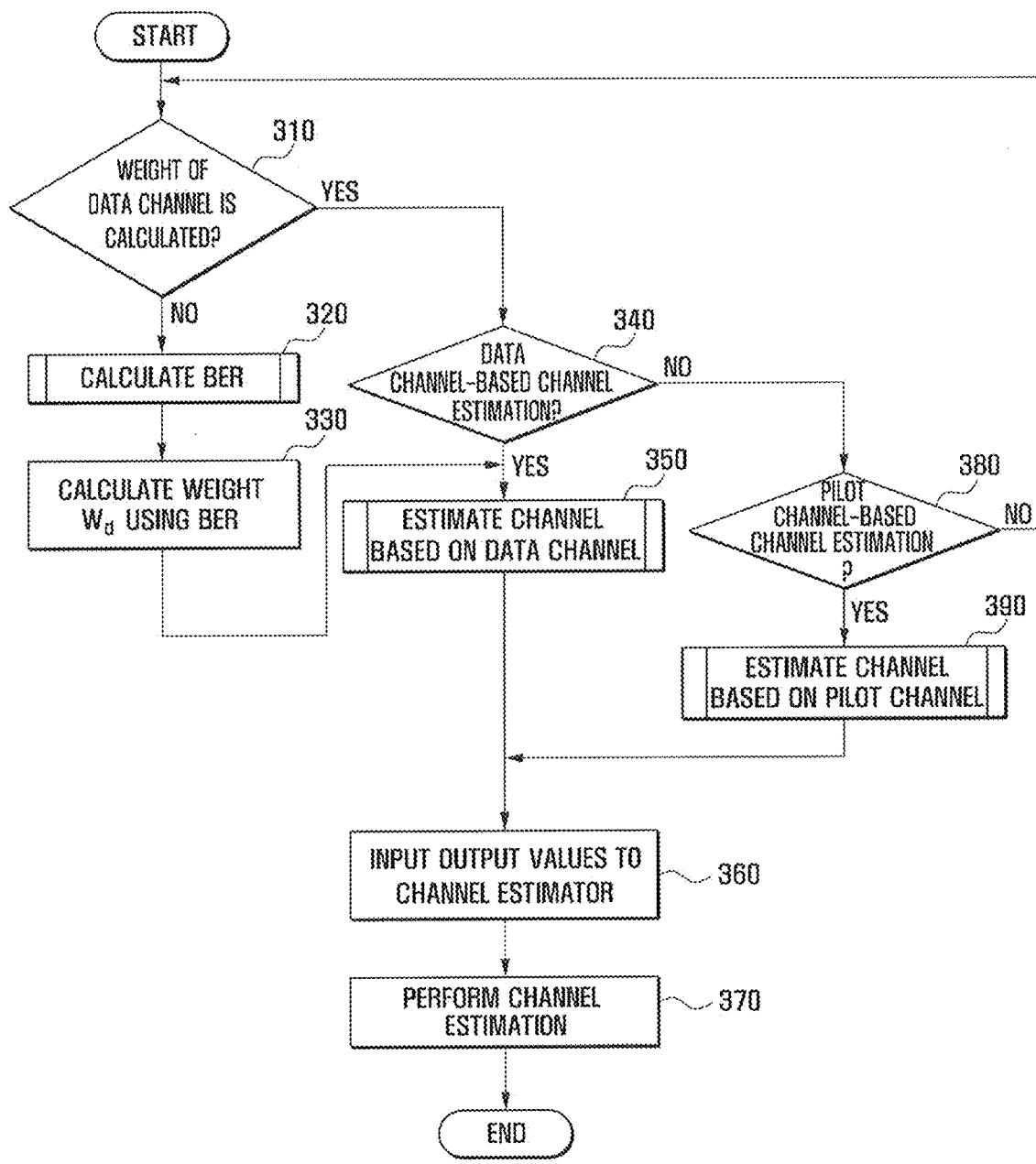
FIG. 3 is a flowchart illustrating a channel estimation methodology, according to an embodiment of the present invention.

Referring now to FIG. 3, a flowchart illustrates a channel estimation method, according to an embodiment of the present invention.

The channel estimation apparatus first determines whether a weight ('$w_d$') for the data channel utilization ratio to be reflected to the channel estimation is calculated in step 310. If the weight ('$w_d$') is not yet calculated, the channel estimation apparatus calculates a BER during transmission of signal in step 320.

The channel estimation apparatus can measure the ratio of the total number of bits received to those that are erroneous during a predetermined transmission time. The BER calculation process is described in more detail below with reference to FIG. 4.

The channel estimation apparatus calculates the weight '$w_d$' as the data channel utilization ratio for the channel estimation in step 330. The weight '$w_d$' calculation process is calculated using Equation 7.

If the weight '$w_d$' is calculated already at step 310, the channel estimation apparatus determines whether to calculate a channel estimation value (the second estimation value) from the data channel in step 340. If it is determined to calculate the channel estimation value from the data channel, the channel estimation apparatus performs channel estimation on the data channel in step 350. The channel estimation apparatus performs the channel estimation with the data channel utilization ratio according to the weight '$w_d$' calculated at step 330. The data channel-based channel estimation process is described in greater detail below with reference to FIG. 5. The channel estimation apparatus inputs the data channel-based estimation value to the channel estimator 240 in step 360. The channel estimator 240 performs channel estimation using the data channel-based estimation value in step 370.

If it is determined that the channel estimation value is not calculated from the data channel at step 340, the channel estimation apparatus determines whether to calculate a channel estimation value (the first estimation value) from the pilot channel in step 380. If it is determined that the channel estimation value is calculated from the pilot channel, the channel estimation apparatus calculates the pilot channel-based estimation value in step 390. The pilot channel-based channel estimation process is described in greater detail below with reference to FIG. 6. The channel estimation apparatus inputs the pilot channel-based estimation value to the channel estimator 240 in step 360. As a consequence, the channel estimator 240 performs channel estimation using the data channel-based estimation value and the pilot-channel estimation value in step 370.

As described above, the channel estimation method according to an embodiment of the present invention allows the channel estimation apparatus to estimate the channel using both pilot and data channels, and adjust the utilization ratio of the data channel estimation in accordance with the wireless channel environment. This results in an improvement in channel estimation accuracy.

Figure 4:
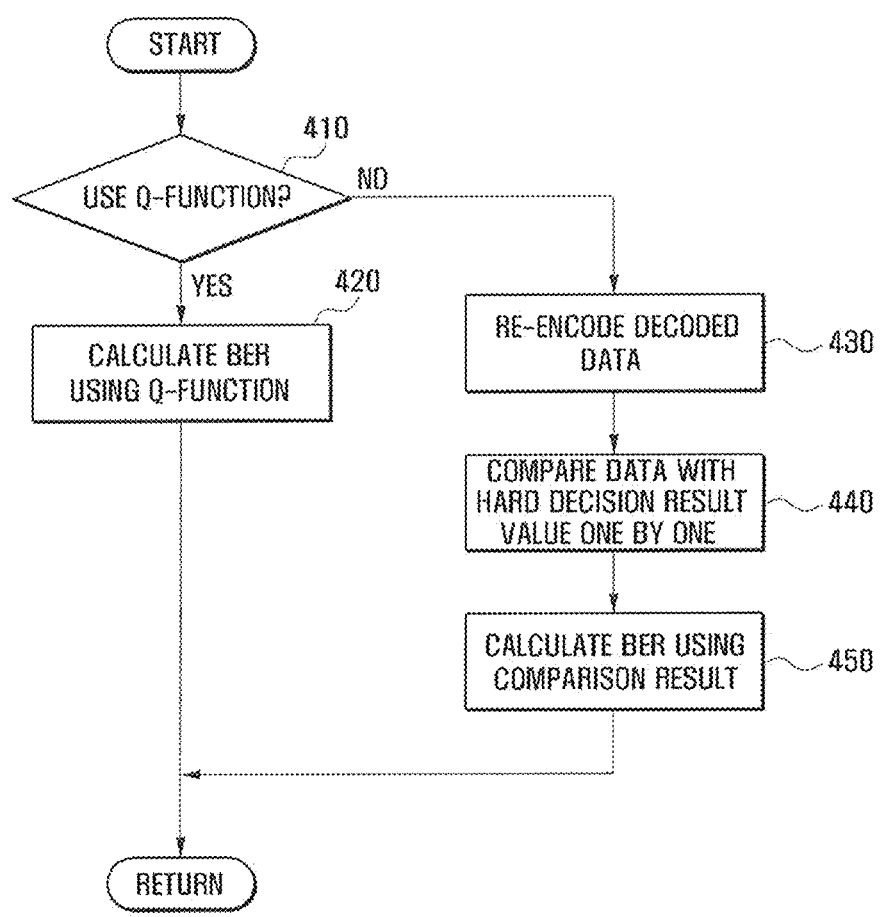
FIG. 4 is a flowchart illustrating a BER calculation process of the channel estimation methodology of FIG. 3, according to an embodiment of the present invention.

FIG. 4 is a flowchart illustrating the BER calculation process of the channel estimation methodology of FIG. 3, according to an embodiment of the present invention. In an embodiment of the present invention, the channel estimation apparatus can calculate the logical BER from the SNR or calculate the BER directly by individually comparing the data.

The channel estimation apparatus determines whether to use the Q-function for calculating BER in step 410. If it is determined to use the Q-function, the channel estimation apparatus measures the SNR of the data channel and calculates the logical BER using the measured SNR in step 420.

If it is determined the Q-function is not used, the channel estimation apparatus calculates the BER directly using the received data channel. Specifically, the channel estimation apparatus re-encodes the data (D1) obtained by decoding the potential data signal into data (X2) in step 430. The channel estimation apparatus compares the data (X1) obtained by encoding the originally received potential data signal and the re-encoded data (X2) one by one in step 440. Finally, the channel estimation apparatus calculates the BER using the comparison results in step 450.

The BER calculated in the above manner can be used for calculating the weight ('$w_d$') for determining the utilization ratio of the data channel for channel estimation.

Figure 5:
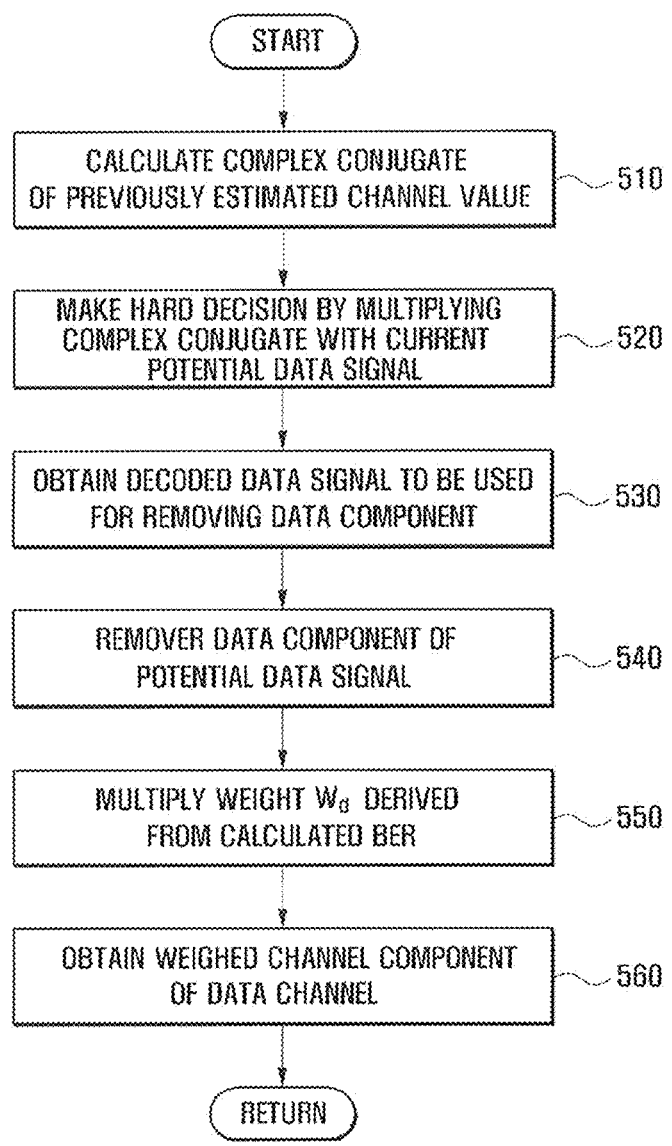
FIG. 5 is a flowchart illustrating a data channel-based channel estimation process of the channel estimation methodology of FIG. 3, according to an embodiment of the present invention.

FIG. 5 is a flowchart illustrating the data channel-based channel estimation process of the channel estimation methodology of FIG. 3, according to an embodiment of the present invention.

The channel estimation apparatus calculates the complex conjugate $\hat{h}(i-1)^+$ of the previously estimated channel value $\hat{h}(i-1)$ in step 510. The channel estimation apparatus makes a hard decision on the data signal by multiplying the calculated complex conjugate $\hat{h}(i-1)^+$ with the currently received potential data signal $x_d(i)$ in step 520. The channel estimation apparatus obtains the hard decision result data d(i) for removing data signal component from the received potential data signal $x_d(i)$ in step 530.

Sequentially, the channel estimation apparatus calculates the complex conjugate $\hat{d}(i)^+$ of the hard decision result data d(i) and multiplies the calculated complex conjugate d(i)⁺ with the received potential data signal $x_d(i)$ to output the second estimation value of the channel from which the data signal component of the potential data signal is removed in step 540.

Next, the channel estimation apparatus multiplies the second estimation value with the weight '$w_d$' calculated at step 330 of FIG. 3 so as to obtain the weighted channel estimation value of the data channel in step 560. The weighted channel estimation value is input to the channel estimator 240 for estimating the entire channel.

The channel estimation method, according to an embodiment of the present invention, can adjust the utilization ratio of the data channel for use in channel estimation, resulting in improvement of channel estimation accuracy.

Figure 6:
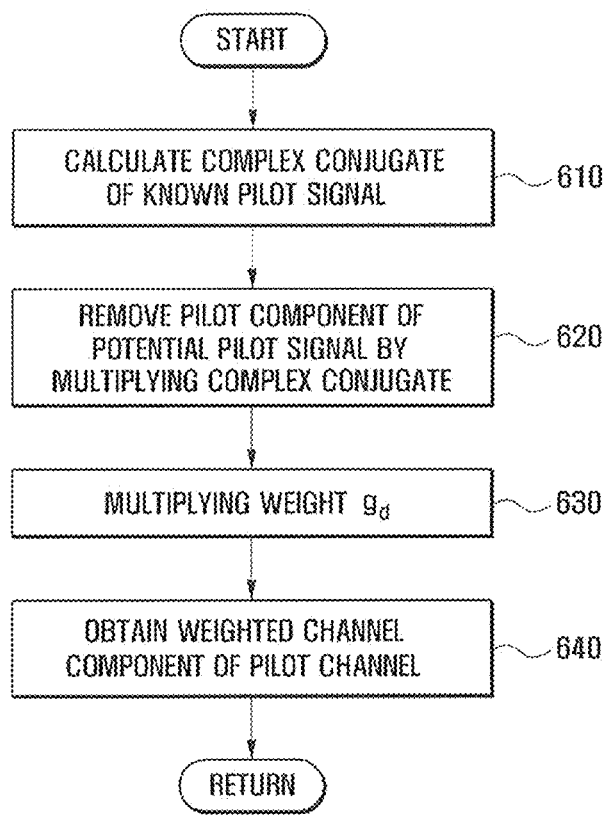
FIG. 6 is a flowchart illustrating a pilot data channel-based channel estimation process of the channel estimation methodology of FIG. 3, according to an embodiment of the present invention.

FIG. 6 is a flowchart illustrating the pilot data channel-based channel estimation process of the channel estimation methodology of FIG. 3, according to an embodiment of the present invention.

The pilot signal transmitted by the transmitter is known to the receiver. Accordingly; the channel estimation apparatus calculates the complex conjugate p(i)⁺ of the known pilot signal in step 610. Next, the channel estimation apparatus multiplies the calculated complex conjugate p(i)⁺ of the pilot signal with the received potential pilot signal $-j^*x_p(i)$ (reflected phase) so as to remove the pilot component from the received potential pilot signal in step 620. As a consequence, the first estimation value of the channel is obtained.

The channel estimation apparatus adjusts the gain of the first estimation value of the channel, and preferably amplifies the gain in an embodiment of the present invention, by multiplying the first estimation value with the relative value '$g_p$' of the size of the first estimation value in step 630. Consequently, the channel estimation apparatus obtains the weighted channel component of the first estimation value of the channel in step 640.

The obtained channel estimation value is input to the channel estimator 240 to be used for estimating the entire channel.

As described above, in the channel estimation method and apparatus using a data channel according to the present invention, the BER of the data channel is reflected for calculating the weight of the signal input to the channel estimator, thereby improving channel estimation performance as compared to the channel estimation method using only the pilot channel.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A channel estimation apparatus that uses a data channel, comprising:
    a channel value extraction unit that extracts a first estimation value from a potential pilot signal received through a pilot channel and extracts a second estimation value from a potential data signal received through the data channel;
    a weight calculator that calculates a weight for determining a utilization ratio of the potential data signal in channel estimation from an error rate of the potential data signal;
    a channel estimator that estimates a final estimation value using the first estimation value and the second estimation value weighted by the weight calculated by the weight calculator;
    a gain adjustment unit that adjusts gains of the first and second estimation values, wherein the gain adjustment unit sums gain-adjusted first and second estimation values and outputs a sum of the gain-adjusted first and second estimation values to the channel estimator; and
    a hard decision unit that makes a hard decision on the potential data signal for removing a data component of the received potential data signal using a previous channel estimation value,
    wherein the channel value extraction unit outputs the first estimation value by multiplying a pilot signal with the received potential pilot signal and outputs the second estimation value by multiplying a data signal obtained as a result of the hard decision with the received potential data signal.

2. The channel estimation apparatus of claim 1, wherein the error rate is a Bit Error Rate (BER).

3. The channel estimation apparatus of claim 1, wherein the weight is calculated by:

$$wd = g_d * (1 - 2BER),$$

where $w_d$ is the weight, and $g_d$ is a gain factor of the potential data signal, and BER is a bit error rate.

4. The channel estimation apparatus of claim 1, wherein the gain adjustment unit multiplies the first estimation value with a gain factor of the potential pilot signal and multiplies the second estimation value with the weight.

5. The channel estimation apparatus of claim 1, wherein the data channel is an Enhanced-Dedicated Physical Control Channel (E-DPCCH) used in a High Speed Uplink Packet Access (HSUPA) system.

6. A channel estimation method that uses a data channel, comprising the steps of:
    extracting a first estimation value from a potential pilot signal received through a pilot channel and a second estimation value from a potential data signal received through the data channel;
    calculating a weight for determining a utilization ratio of the potential data signal in channel estimation from an error rate of the potential data signal;
    estimating a final estimation value using the first estimation value and the second estimation value;
    adjusting gains of the first and second estimation values of the channel, wherein a gain adjustment unit sums the gain-adjusted first and second estimation values and outputs a sum of the gain-adjusted first and second estimation values to the channel estimator; and
    making a hard decision on the potential data signal for removing a data component of the received potential data signal using a previous channel estimation value,
    wherein extracting comprises:
    outputting the first estimation value by multiplying the pilot signal with the received potential pilot signal; and
    outputting the second estimation value by multiplying a data signal obtained as a result of the hard decision with the received potential data signal.

7. The channel estimation method of claim 6, wherein the error rate is a Bit Error Rate (BER).

8. The channel estimation method of claim 7, wherein the weight is calculated using:

$$wd = g_d * (1 - 2BER),$$

where $w_d$ is the weight, and $g_d$ is a gain factor of the potential data signal, and BER is a bit error rate.

9. The channel estimation method of claim 6, wherein adjusting gains comprises:
    multiplying the first estimation value with a gain factor of the potential pilot signal; and
    multiplying the second estimation value with the weight.

10. The channel estimation method of claim 6, wherein the data channel is an Enhanced-Dedicated Physical Control Channel (E-DPCCH) used in a High Speed Uplink Packet Access (HSUPA) system.

* * * * *